Jan. 7, 1969 N. W. UPTON ET AL 3,420,937
APPARATUS AND PROCESS FOR THE MANUFACTURE
OF CHEMICAL REACTION PRODUCTS
Filed Feb. 20, 1967 Sheet 2 of 2
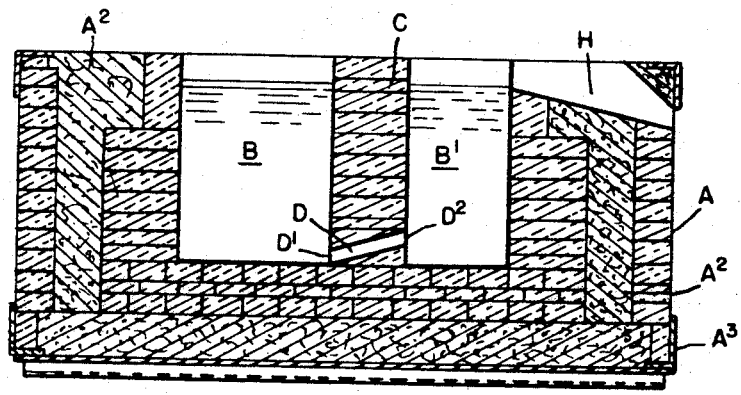
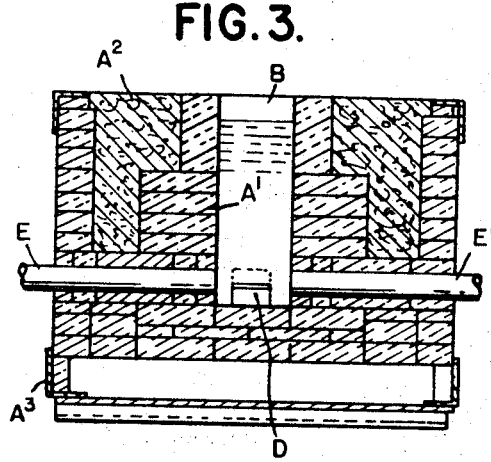
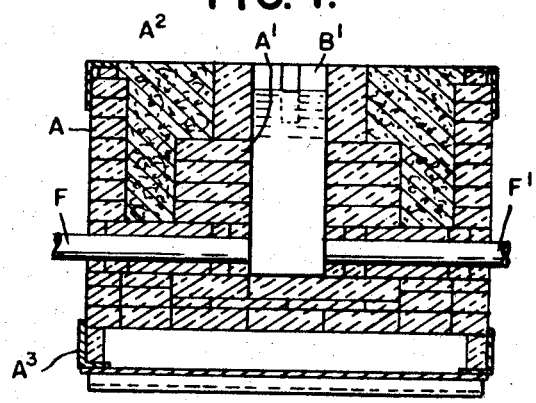

United States Patent Office 3,420,937
Patented Jan. 7, 1969

3,420,937
APPARATUS AND PROCESS FOR THE MANUFACTURE OF CHEMICAL REACTION PRODUCTS
Norman W. Upton, Mount Clemens, Mich., Richard C. Upton, deceased, late of Lexington, Mich., by Norman W. Upton and Elizabeth J. Harper, co-executors, Mount Clemens, Mich., assignors to Upton Electric Furnace Company, Inc., Roseville, Mich., a corporation of Michigan
Filed Feb. 20, 1967, Ser. No. 617,423
U.S. Cl. 13—9                                    10 Claims
Int. Cl. H05b 7/18

ABSTRACT OF THE DISCLOSURE

The apparatus of the invention consists of an electric furnace of the fused salt bath type comprising a series of interconnected reaction chambers through which the material under treatment is successively passed. Heat is generated by passage of electric current from electrodes through the fused material in each chamber by an electric transformer arranged to provide a plurality of circuits for maintaining a heat differential in the various chambers. A passageway connecting adjacent chambers permits continuous flow while generating sufficient heat therein to maintain fluidity.

---

Figure 1:
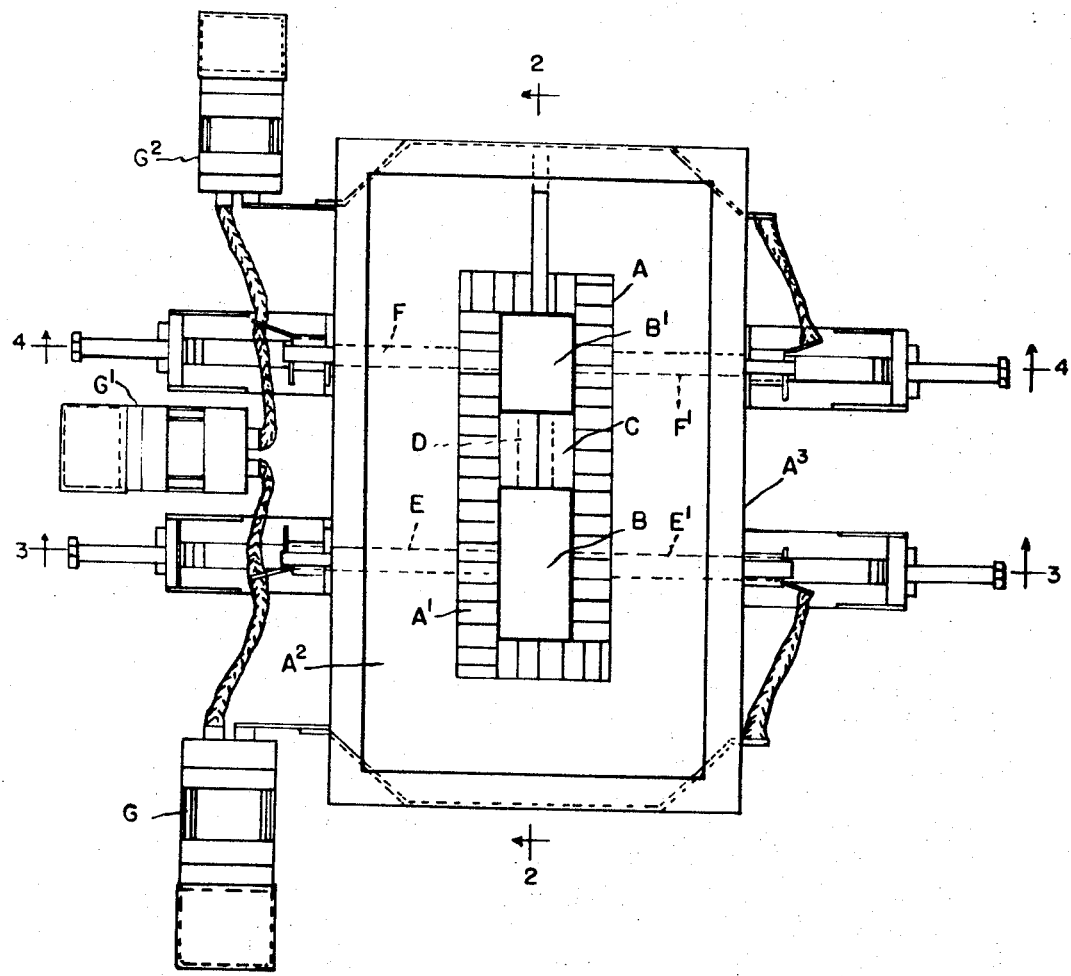

The invention relates to the manufacture of chemical products from raw materials requiring reaction at high temperatures for a considerable length of time.

The process of the invention relates to the manufacture of a desired chemical product such as sodium hexametaphosphate by feeding raw materials through successive chambers and producing differential temperatures in the respective chambers and producing sufficient heat in the connecting passageway so that the final product will be discharged from the last of the chambers.

BACKGROUND OF THE INVENTION

(1) Field of the invention

The invention pertains to different fields of art. One relates to multiple chamber electric furnaces of the fused bath type in which the heat is generated by a plurality of circuits through the fused bath by an electric transformer. Another field relates to the continuous production of thermochemical reaction products by feeding the raw materials through a series of reaction zones and maintaining differential temperatures in said zones while controlling the rate of feed in order that the reaction may be completed prior to the continuous discharge. In the prior art such processes have been carried out in gas fired furnaces utilizing a single reaction chamber of considerable length. The present invention provides a better process utilizing a furnace which occupies much less floor space. Hexametaphosphate (Calgon) is presently manufactured in a gas fired furnace having a long and wide but shallow bath. Gas fuel is fired and directed on the surface of the bath. The temperature of the combusted gas coupled with the moisture and oxidation products severely attack the refractories of the furnace which are above the melted product. Another problem is the poor economy effected by the tremendous quantity of heat loss up the flue.

Another problem is the intermediate temperature zone between the charge end of this long furnace and the hot end or discharge end. The percentage of product conversion is a function of temperature. Also the conversion takes place at a rather precise temperature theoretically and in practice it is therefore desirable to effect good temperature control. Good temperature control is quite impossible with the present art. Also, the product, consisting of partly converted and non-converted matter, in the intermediate zone tends to freeze to the bottom and gradually build up in height to form a barrier to continual flow from charge to discharge end. This necessitates the temporary shut down of production in order to remove the solid barrier material.

(2) Description of the prior art

The prior art in multiple chamber electric furnaces is represented by the following patents:
Skinner et al., 2,610,217, Sept. 9, 1952; Skinner et al., 2,680,772, June 8, 1954; Upton, 2,820,075, Jan. 14, 1958; Upton, 3,049,576, Aug. 14, 1962; Upton, 3,085,124, Apr. 9, 1963; Upton, 3,128,327, Apr. 7, 1964.

SUMMARY OF THE INVENTION

The invention relates to the manufacture of thermochemical reaction products in an electric furnace of the fused bath type so constructed and arranged and operated as to continuously and economically produce the desired final product from the raw materials introduced therein. The apparatus comprises a series of interconnected reaction chambers through which the material under treatment is successively passed and in each of which it is subjected to independently controlled heating means. The heat is produced by passage of electric current from electrodes through the fused material in each chamber and the source of electric energy is so arranged that the amount of current through each chamber is independently controlled. The energy source is also arranged so that a current may be passed through the passageways interconnecting the successive chambers.

One of the important features of the invention is the design of the interconnecting channel in relation to the production of heat in the chambers by the electrical circuits. The design is related to the rate of feed of the materials so that the process may be continuously operated with the production of a final quality product in an economical manner.

A more specific object of the invention is the design of an electric furnace of the fused bath type for the economical manufacture of technical grades of sodium hexametaphosphate detergents containing $(NaPO_3)_6$. Such detergents are used commercially in the form of powder, flakes, and as small, broken, glass-like particles and are useful as water softeners and detergents because of their ability to keep calcium, magnesium and iron salts in solution. One technical grade is commercially available under the trademark "Calgon." Sodium hexametaphosphate is usually manufactured from phosphoric acid and sodium carbonate and requires reaction temperatures about 1600° F.

THE DRAWINGS

FIGURE 1 is a plan view of the apparatus.
FIGURE 2 is a cross section on line 2—2 of FIGURE 1.
FIGURES 3 and 4 are cross sections respectively on lines 3—3 and 4—4 of FIGURE 1.

DESCRIPTION OF A PREFERRED EMBODIMENT

A is a housing comprising a wall of refractory material surrounding a series of chambers B and B'. Between the chambers B and B' is a cross wall C which, however, has formed therein a channel D for the passage of material from one chamber to the other. This channel is preferably located at the lower end portion of the cross wall C and its end port portions D' and D² respectively connecting with the chambers B and B'. Electric current is introduced through electrodes E, E' and F, F' respectively to the chambers B and B'. This current may be supplied from any suitable source such as transformers G, G', G², and when the apparatus is working, flows through the material in the respective chambers and in the channel D.

The chambers B, B' are well chambers and while as shown there are only two in series, it may be desirable to use a larger number for the manufacture of certain products. The wall and base of the chambers may be formed of highly refractory block units A' with a monolithic supporting structure $A^2$ of concrete or any suitable material and a reinforcing metallic frame $A^3$.

In the manufacture of the specific product sodium hexametaphosphate, the raw materials used are a mixture of phosphoric acid, $H_3PO_4$, sodium carbonate and water. This mixture is introduced as a slurry into the chamber B in which the electric current supplied by the transformer G through electrodes E, E' will heat the mixture preferably to a temperature of from 1100° F. to 1200° F. The material will then pass through the channel D in which it is further heated by current from transformer G' and into the chamber B'. In the latter chamber current from the transformer $G^2$ passing through electrodes F and F' into the material will still further heat it, preferably to about 1600° F. The time of treatment is determined by the rate of flow through the passage D and is sufficient to complete the desired reactions which include the driving off of carbon dioxide ($CO_2$) and water vapor. The final product will be discharged from the upper end of the chamber B' through an overflow channel H. Thus, by periodically introducing the raw materials into the chamber B a substantially continuous production of the product is obtained.

To further illustrate the invention the following specific examples are given:

*Example 1.*—53.7 pounds of 76% phosphoric acid ($H_3PO_4$) and 94.6 pounds of disodium phosphate duohydrate crystals are mixed in 6.2 pounds of water. This mixture is periodically fed into the chamber B at the rate of 15.45 pounds every six minutes. Electric power is supplied to remove the water from the mixture during that time and to maintain the temperature of the chamber B' at 1600° F. The molten product will be discharged at the rate of 100 pounds per hour.

*Example 2.*—A furnace of the type shown in the drawings can be made as a double-chamber ceramic furnace contained in a welded steel frame of outside dimensions 103 inches long by 53 inches wide and 43 inches high with eight built-in continuing graphite electrodes. The transformers as shown in FIGURE 1 consist of three 100-kw., single phase, 440-volt, 60-cycle transformers comprising a balanced three-phase power bank. Secondary connectors connect the secondaries of the transformers to the eight water-cooled graphite electrodes as illustrated. The apparatus is provided with a thermocouple for immersion in the raw mix bath and a radiation thermocouple assembly for sighting on the finishing bath. This is connected electrically to an indicating and controlling pyrometer.

In operating the furnace of this example the temperature of the raw mix chamber and the passageway between the two chambers is not critical and is kept within allowable limits by adjusting the voltage supplied by the other two transformers to their electrodes and by the rate of raw mix feed. It is only necessary that the temperature in the channel D be maintained high enough to prevent solidification at that point thereby blocking the flow. The controlling pyrometer is connected by the necessary relays for controlling the temperature of the finishing bath and for controlling the magnetic switch of the transformer supplying power for the bath B' by the on and off method.

In the above description the allowable limits for chamber B are those which insure the removal of practically all the water (and $CO_2$ if carbonate is used in the raw mix) from the raw mix so that no bubbles of steam or $CO_2$ rise in the finishing chamber. It is also desirable that the temperature of the material passing into the finishing chamber through the passageway is high enough to enable the power available for the finishing chamber to maintain the temperature of this continuously supplied bath at the required finishing temperature. Because of the above the transformer supplying power to the passageway may be effective in lessening the demands upon the power supply for the finishing chamber.

In operating the furnace of this example the first step is to mix 75% phosphoric acid $H_3PO_4$ plus about one-third of its weight of water, with sodium carbonate. There is a certain disadvantage in this particular mixture because of frothing and spattering due to the generation of heat and the formation of carbon dioxide gas. Therefore, Example 2 can be carried out by using disodium phosphate duohydrate for the sodium carbonate in the same manner as set forth in Example 1.

CONCLUSION

The preceding description sets forth the inventive idea and certain specific embodiments thereof. It will be understood that there are a variety of electrical arrangements available that will establish workable voltage and current relations across and through a channel of certain dimensions. It is believed that the channel D and its function as hereinbefore set forth is a critical factor in the present invention. The furnace design as herein set forth narrows the intermediate zone. By using the channel D as an electrical conductor through which sufficient current and voltage relations are maintained to effect $I^2R$ drop, enough heat is generated in the materials to preclude any frozen build-up. The electric furnace of the present invention carries the thermochemical conversion to a greater degree of completion than the gas fired furnaces of the prior art. By sloping the channel upward from the charged chamber B to the second chamber B' as illustrated in FIGURE 2, the hotter and therefore lighter weight product within this channel tends to flow into the second chamber, quite apart from the flow tendency due to the introduction of more raw materials into chamber B.

What we claim as our invention is:

1. Process for the manufacture of a thermochemical reaction product comprising:
    (a) feeding a mixture of chemical compounds into the first of a series of adjacent furnace chambers having a connecting passage permitting gravity flow into a subsequent chamber,
    (b) conducting electric current through the mixtures in said chambers to produce predetermined differential temperatures in the respective chambers,
    (c) maintaining the rate of electric current flow through one of said chambers to produce a temperature sufficient to cause interaction of said chemical compounds and to liberate a gaseous component,
    (d) maintaining the rate of electric current flow through a subsequent chamber to produce a temperature sufficient to maintain the mixture in a fluid condition, and to effect the desired reaction,
    (e) maintaining the feeding of additional mixture into said first chamber at a rate sufficient to complete the desired reaction in a subsequent chamber, and
    (f) continuously withdrawing the final product of reaction from the last chamber of said series.

2. Process according to claim 1 in which current is also passed through said connecting passage.

3. Process according to claim 2 in which the current flow is produced by three 100 kw., single phase, 440 volt, 60 cycle transformers comprising a balanced three-phase power bank.

4. Process according to claim 1 in which the materials in said first chamber comprise a phosphoric compound, a carbonate compound and water, in which:
    (a) the current through said first chamber is regulated to maintain a temperature therein from 1100° F. to 1200° F.,
    (b) the current in said second chamber is regulated to maintain a temperature therein about 1600° F., (c) the current through said passageway is regulated to produce a temperature high enough to prevent blockage thereof, and (d) the rate of feeding is controlled to continuously discharge hexametaphosphate.

5. Process according to claim 4 in which the materials in said first chamber comprise a water mixture of $H_3PO_4$ and disodium phosphate duohydrate crystals and into the heated mix there is continuously fed a water slurry comprising $H_3PO_4$ and $Na_2CO_3$ at a rate of 15.45 pounds of slurry every six minutes thereby producing sodium hexametaphosphate at the rate of about 100 pounds per hour.

6. Apparatus for the production of thermochemical reaction products, comprising a wall enclosing a series of chambers, a cross wall between adjacent successive chambers having a channel therethrough of relatively small cross section forming a connecting passage for the gradual passage of the content of the one chamber into the other, said channel being located at the lower end portion of said cross wall, a pair of electrodes for each chamber, said electrodes being oppositely located concentrically in each sidewall at substantially the same level as said channel, whereby material introduced into the chamber at one end of the series for treatment therein will pass through the remainder of the series for further treatment in each and the final product will be discharged from the last chamber of the series.

7. Apparatus according to claim 6 in which an electric transformer is connected through said electrodes in the respective chambers so as to produce a plurality of circuits through the materials in said chambers including one circuit which passes through the channel connecting successive chambers whereby sufficient heat is generated in the material therein to maintain it in a fluid condition.

8. Apparatus according to claim 7 in which power is supplied by three 100 kw., single phase, 440 volt, 60 cycle transformers comprising a balanced three-phase power bank thereby producing a temperature of 1100° F. to 1200° F. in the first chamber and a temperature of 1600° F. in the adjoining chamber.

9. Process for the manufacture of a thermochemical reaction product in an apparatus as set forth in claim 6, comprising:

(a) feeding a mixture of chemical compounds into the first of said chambers, (b) conducting electric current through the mixtures in at least two of said chambers, (c) maintaining the rate of electric current flow through one of the chambers at the beginning of the series sufficient to cause liberation of a gaseous component, (d) maintaining the rate of electric current flow through said apparatus to produce a temperature sufficient to maintain the mixture in a fluid condition, (e) maintaining the rate of electric current flow through one of the chambers at the end of said series to maintain a temperature high enough to complete the desired reaction, and (f) continuously withdrawing the final product of reaction from the last chamber of said series.

10. Process according to claim 9 in which the chemicals introduced into said series comprise a sodium phosphate compound and water and in which:

(a) the current through one of the chambers at the beginning of the series is regulated to maintain a temperature therein on the order of 1100° F. to 1200° F., (b) the current through one of the chambers at the end of the series is regulated to maintain a temperature therein on the order of 1600° F., and (c) the rate of feeding is controlled to continuously discharge hexametaphosphate.

References Cited
UNITED STATES PATENTS

| 2,610,217 | 9/1952 | Skinner et al. | 13—6 |
| 2,820,075 | 1/1958 | Upton | 13—23 |
| 3,049,576 | 8/1962 | Upton | 13—23 |

BERNARD A. GILHEANY, *Primary Examiner.*

H. B. GILSON, *Assistant Examiner.*

U.S. Cl. X.R.

13—10, 18